（12) United States Patent
Ashar et al.

(10) Patent No.: US 10,803,717 B2
(45) Date of Patent: Oct. 13, 2020

(54) SECURITY APPLICATION FOR RESIDENTIAL ELECTRICAL SWITCH SENSOR DEVICE PLATFORM

(71) Applicant: Nuro Technologies, Inc., San Jose, CA (US)

(72) Inventors: Premal Ashar, Sunnyvale, CA (US); Vaibhavi Ashar, Sunnyvale, CA (US); George Scolaro, Sunnyvale, CA (US); Larry Nasarabadi, Livermore, CA (US)

(*) Notice: Subject to any disclaimer, the term of this patent is extended or adjusted under 35 U.S.C. 154(b) by 0 days.

(21) Appl. No.: 15/924,203

(22) Filed: Mar. 17, 2018

(65) Prior Publication Data

US 2018/0210438 A1   Jul. 26, 2018

Related U.S. Application Data

(63) Continuation of application No. 15/249,314, filed on Aug. 26, 2016.

(Continued)

(51) Int. Cl.
| | | |
|---|---|---|
| G08B 13/14 | (2006.01) | |
| H04W 84/18 | (2009.01) | |
| G08B 13/00 | (2006.01) | |
| H04L 12/28 | (2006.01) | |
| G05B 15/02 | (2006.01) | |
| G05B 19/042 | (2006.01) | |
| H04W 84/20 | (2009.01) | |
| F24F 11/30 | (2018.01) | |

(52) U.S. Cl.
CPC .......... *G08B 13/1436* (2013.01); *F24F 11/30* (2018.01); *G08B 13/00* (2013.01); *H04L 12/2803* (2013.01); *H04W 84/18* (2013.01); *G05B 15/02* (2013.01); *G05B 19/042* (2013.01); *G05B 2219/163* (2013.01); *G05B 2219/24024* (2013.01); *G05B 2219/25011* (2013.01); *G05B 2219/25168* (2013.01); *G05B 2219/2642* (2013.01); *H04L 12/2816* (2013.01); *H04W 84/20* (2013.01); *Y02B 70/3241* (2013.01); *Y04S 20/227* (2013.01); *Y04S 20/228* (2013.01)

(58) Field of Classification Search
None
See application file for complete search history.

(56) References Cited

U.S. PATENT DOCUMENTS

2003/0169171 A1* 9/2003 Strubbe .............. G08B 21/0423
340/573.1
2005/0128067 A1* 6/2005 Zakrewski ............. G08B 29/20
340/511

(Continued)

*Primary Examiner* — Qing Yuan Wu
(74) *Attorney, Agent, or Firm* — Joseph L. Acayan

(57) ABSTRACT

Implementations generally relate to systems, apparatuses, and methods for a security application for a residential electrical switch sensor device platform. In some implementations, a sensor device performs operations including detecting an activity in the living space, determining contextual security information, and determining an occurrence of an intrusion event based on the activity in the living space. In response to the occurrence of the intrusion event, the device is operative to perform further operations including sending a notification to one or more destinations based on the intrusion event, and activating one or more surveillance devices based on the intrusion event.

20 Claims, 6 Drawing Sheets

Related U.S. Application Data

(60) Provisional application No. 62/473,911, filed on Mar. 20, 2017, provisional application No. 62/215,162, filed on Sep. 8, 2015.

(56) References Cited

U.S. PATENT DOCUMENTS

| | | |
|---|---|---|
| 2011/0137836 A1 | 6/2011 | Kuriyama et al. |
| 2011/0156640 A1 | 6/2011 | Moshfeghi |
| 2013/0033363 A1 | 2/2013 | Gabara |
| 2014/0246993 A1 | 9/2014 | Catalano et al. |
| 2014/0324527 A1 | 10/2014 | Kulkarni et al. |
| 2014/0324615 A1 | 10/2014 | Kulkarni et al. |
| 2015/0096352 A1* | 4/2015 | Peterson ................. F24F 11/30 73/31.02 |
| 2016/0149720 A1 | 5/2016 | Hatae et al. |
| 2016/0189532 A1* | 6/2016 | Malhotra ............. G08B 29/185 340/506 |
| 2016/0335865 A1* | 11/2016 | Sayavong .......... G08B 13/2491 |

* cited by examiner

SECURITY APPLICATION FOR RESIDENTIAL ELECTRICAL SWITCH SENSOR DEVICE PLATFORM

CROSS REFERENCES TO RELATED APPLICATIONS

This application is a continuation of U.S. patent application Ser. No. 15/249,314, entitled RESIDENTIAL SENSOR DEVICE PLATFORM, filed on Aug. 26, 2016, which claims priority from U.S. Provisional Patent Application No. 62/215,162, entitled RESIDENTIAL SENSOR DEVICE PLATFORM, filed on Sep. 8, 2015, and claims priority from U.S. Provisional Patent Application No. 62/473,911, entitled SECURITY APPLICATION FOR RESIDENTIAL ELECTRICAL SWITCH SENSOR DEVICE PLATFORM, filed on Mar. 20, 2017, which are hereby incorporated by reference as if set forth in full in this application for all purposes.

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to devices, apparatuses, and methods for a security application for a residential electrical switch sensor device platform. In some implementations, a sensor device performs operations including detecting an activity in the living space, determining contextual security information, and determining an occurrence of an intrusion event based on the activity in the living space. In response to the occurrence of the intrusion event, the sensor device performs further operations including one or more of sending a notification to one or more destinations based on the intrusion event, and activating one or more surveillance devices based on the intrusion event.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods of a residential electrical switch sensor device platform. As described in more detail below, various implementations of the residential sensor device platform provide an infrastructure within and around a residence that includes sensor-enabled devices within rooms of the residence (e.g., interior security devices), as well as exterior to the residence (e.g., outdoor lighting, exterior security devices, etc.). Note that the reference to the phrase "living space" may include indoor and outdoor spaces, depending on the particular implementations. Furthermore, in some implementations, the residential sensor device platform provides learning of common usage patterns by tracking and learning of routine and pattern-based activity that eventually, and automatically configures home automation in order to determine the occurrence of intrusions in a home. Some implementations provide the sensing of motion or activity, temperature, and daylight. As described in more detail herein, sensor device 120 detects various activities and determines various aspects of activities without the use of a camera. Further, some implementations provide security features, autonomous and networked operation, and cloud intelligence.

As described in more detail herein, implementations provide distributed decision making intelligence at each sensor device for day-to-day use, as well as a network for advanced analytics and pattern and behavior learning. Implementations also provide an intelligent wireless mesh that is self-healing, self-learning, and expandable. Implementations also provide sensor devices in each room or living area of a residency, as well as external to a residency, where the sensor devices provide activity tracking, ambient light, temperature, energy metering, camera, air quality, carbon monoxide (CO) detection, etc. Implementations also provide an efficient, cost-effective, and user-friendly home Internet of Things (IoT) platform including ubiquitous digital, plug and play sensing, stand-alone operation, Wi-Fi mesh, distributed algorithms, self-learning, self-healing, etc.

Figure 1:
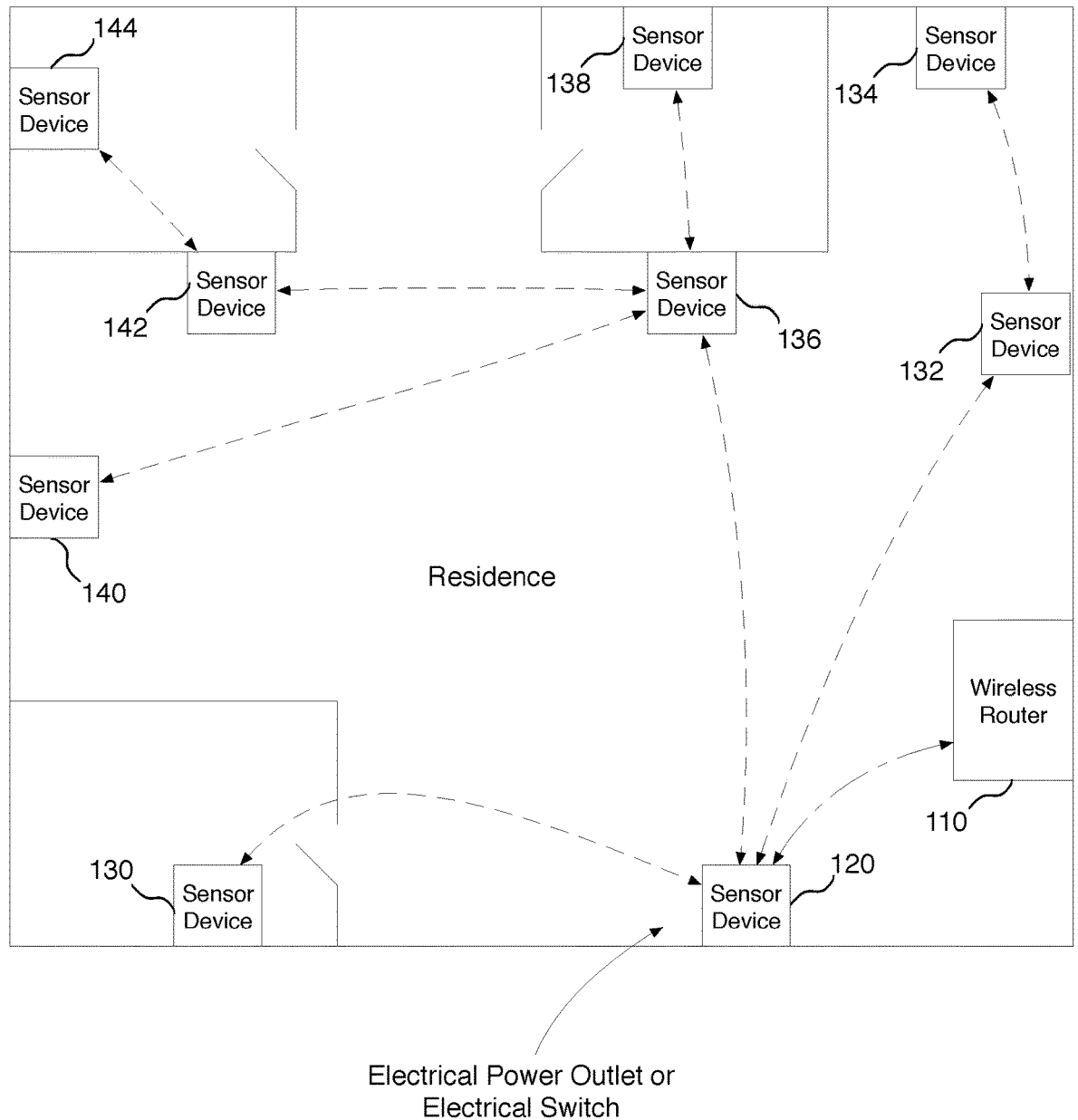
FIG. 1 illustrates a block diagram of an example residential sensor device platform, according to some implementations.

FIG. 1 illustrates a block diagram of an example residential sensor device platform 100, according to some implementations. In some implementations, the residential sensor device platform 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network. In various implementations, at least one sensor of sensor devices 120, 130, 132, 134, 136, 138, 140, 142, and 144 maintains a communication link with wireless router 110.

In various implementations, sensor devices 120, 130, 132, 134, 136, 138, 140, 142, and 144 may be a part of and/or integrated with a stationary device in a residence. Such a stationary device may be an electrical switch such as a light switch, a power outlet, or other stationary devices. While implementations are described herein in the context of wall mounted stationary devices, these implementations and other also apply to other types of stationary devices (e.g., table top devices or other surface top devices, as well as appliances).

In some implementations, one sensor device of sensor devices 120, 130, 132, 134, 136, 138, 140, 142, and 144 is operative as a master sensor device, which maintains the communications link with wireless router 110. As shown, in this particular implementation, sensor device 120 maintains the communication link with wireless router 110. As such, sensor device 120 may be referred to as a master sensor device. The other sensor devices 130, 132, 134, 136, 138, 140, 142, and 144 may be referred to as slave sensor devices.

In various implementations, the sensor device that is operative as the master sensor device may change over time. For example, as described in more detail below, if a master sensor device fails, another sensor device may be selected from among the sensor devices to be operative as the new master sensor device.

In some implementations, the non-master sensor devices 130, 132, 134, 136, 138, 140, 142, and 144 form a wireless mesh network. In various implementations, the master sensor device (e.g., sensor device 120) is also a part of the wireless mesh network. For example, in this case, master sensor device 120 and non-master sensor devices 130, 132, 134, 136, 138, 140, 142, and 144 form a wireless mesh network.

In some implementations, other devices (e.g., a mobile device, third-party device, etc.) may also be a part of the wireless mesh network. In some implementations, such other devices may join the wireless mesh network based on authentication. In some implementations, authentication may be controlled with layer two (L2) MAC pre-authorization for network access. In some implementations, authentication may be controlled by higher-level cloud authentication to enable services.

As shown in FIG. 1, in various implementations, each of non-master sensor devices 130, 132, 134, 136, 138, 140, 142, and 144 are either directly coupled to master sensor device 120, or are indirectly coupled to master sensor device 120 through another of the non-master sensor devices. In some implementations, the wireless mesh network operates over at least one link or interface that is different from a link or interface that is the communication link between master sensor device 120 and wireless router 110.

In various implementations, residential sensor device platform 100 is self-healing. For example, any sensor device may function as a master sensor device. If a particular master sensor device becomes inoperable, another sensor device may take over as the master sensor device. In other words, the role of a master sensor device may change over time. In some implementations, the master sensor device may be the sensor device closest to the wireless router. In some implementations, the master sensor device may be the sensor device that first detects a motion or activity.

As shown by the exemplary residential sensor device platform 100 of FIG. 1, sensor devices 130, 132, and 136 are directly coupled to master sensor device 120. Furthermore, as shown, sensor devices 134, 140, and 142 are indirectly coupled to master sensor device 120 through sensor devices 130, 132, and 136. Sensor devices 130, 132, and 136 can be designated as first order wireless mesh network nodes that are one wireless hop from master sensor device 120. Sensor devices 134, 140, and 142 can be designated as second order wireless mesh nodes that are two wireless hops from master sensor device 120. Furthermore, sensor device 144 is indirectly coupled to the master sensor device through sensor devices 142, and can be designated as a third order wireless mesh node that is three wireless hops from master sensor device 120.

In various implementations, the sensor device may detect not only sensed occupancy but may also detect activity, and distinguish among different objects such as humans, pets, robots, appliances, machinery, etc. For example, the sensor device may determine room usage based on movement patterns, type of motion or activity, size or magnitude of motion or activity, etc. In various implementations, the sensor device may detect particular activities in human behavior that occur in the living space (e.g., walking, running, falling, etc.). Based on this activity information, the sensor device may determine if the occupant is a person, pet (e.g., dog, cat, etc.), or other object.

In some implementations, one or more processors of the one or more of the sensor devices 120, 130, 132, 134, 136, 138, 140, 142, and 144 are operative to monitor the behavior of users of the living space, to receive and store the sensed condition over time, and to analyze the sensed condition to identify user behavior. In various implementations, local decisions and control are performed due to processing at each device. In other words, there is no network dependency to perform implementations described herein. In various implementations, multiple load settings may be achieved due to sensing, decisions, and controls residing on the same device.

In some implementations, the wireless mesh network further includes non-sensor devices that communicate with at least a portion of the sensor devices of the wireless mesh network. Such non-sensor devices can include alarm systems.

Figure 2:
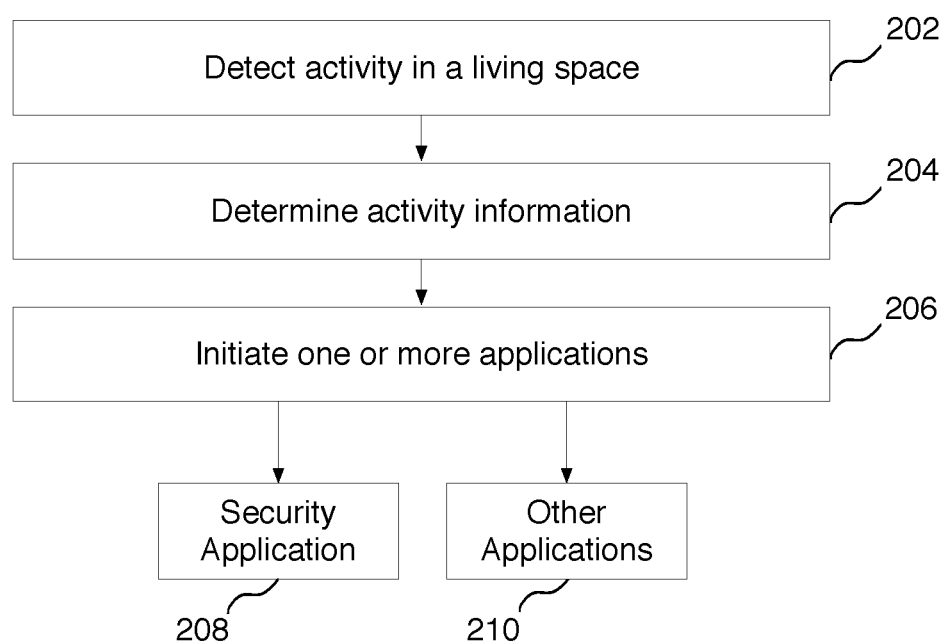
FIG. 2 illustrates an example flow diagram for operation of one or more applications associated with one or more sensor devices, according to some implementations.

FIG. 2 illustrates an example flow diagram for operation of one or more applications associated with one or more sensor devices, according to some implementations. For ease of illustration, example implementation steps described herein are described in the context of a single sensor device, such as sensor device 120. These implementations and others may apply to any sensor device, such as any one or more sensor devices of FIG. 1.

Referring to both FIGS. 1 and 2, a method is initiated at block 202, where sensor device 120 detects activity in a living space. Activity may include, for example, a person entering a room, a person making a motion from a still position, etc.

At block 204, sensor device 120 determines activity information associated with the activity. In various implementations, the sensor may detect particular activities in human behavior that occur in the living space (e.g., walking, running, falling, etc.). For example, a person may stand up from a sitting position. The person may walk across a room. The person may enter a room from another room. In some implementations, sensor device 120 may determine which other room the person came from by obtaining activity information from the last sensor device that detected activity information of the person. In various implementations, sensor device 120 aggregates activity information from itself and other sensor devices if available. Sensor device 120 also automatically sends aggregated activity information to other sensor devices directly and/or via a wireless router.

In some implementations, sensor device 120 determines if it is in a vacation mode. As described in more detail herein, in various implementations, applications running on sensor device 120 may perform different steps depending on whether sensor device 120 is in vacation mode or not. The various types of activity information may depend on the particular implementation and are described in more detail herein.

In some implementations, sensor device 120 may detect activity when the sensor device is on vacation mode (e.g., the user is on vacation). In some implementations, a sensor device may detect activity when the device is in an inactive mode (e.g., when the user is supposed to be inactive). In some implementations, a sensor device might not detect activity when the user is supposed to be active within and during certain periods. As such, the sensor device may issue an alert. In some implementations, the sensor device may pair up with other devices to detect other specifics (e.g., a possible fall that the user has taken).

At block 206, sensor device 120 initiates one or more applications to perform various functions. In various implementations, sensor device 120 provides a unified single device platform for multiple applications or services, which are described in more detail herein. In various implementations, the particular applications that sensor device 120 initiations may depend on the activity information.

At block 208, sensor device 120 initiates a security application. In some implementations, sensor device 120 may initiate the security application based on predetermined behavioral patterns that sensor device 120 detects. For example, in some implementations, sensor device 120 may initiate the security application when sensor device 120 detects that the person is entering the residence through non-legitimate means (e.g., not through the front door, through a patio door, through a garage door, through a window, etc.), especially when residence is supposed to be empty (e.g., during the day, when sensor device 120 is on vacation mode, etc.). As described in more detail herein, when the security application detects intrusion events, the security application performs various security-related functions.

At block 210, sensor device 120 may initiate other types of applications. The particular types of applications may vary depending on the particular implementation.

Figure 3:
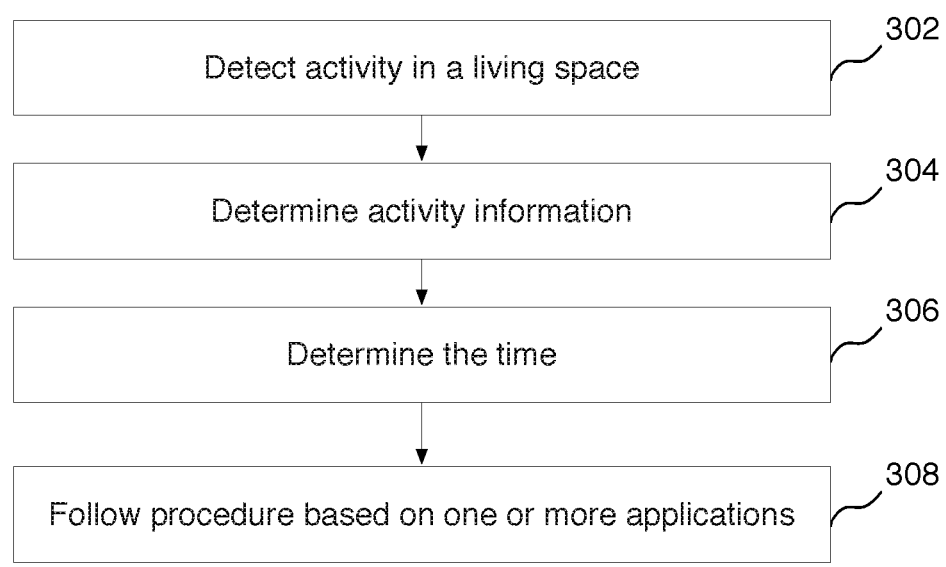
FIG. 3 illustrates an example flow diagram for operation of a sensor device, according to some implementations.

FIG. 3 illustrates an example flow diagram for operation of a sensor device, according to some implementations. For ease of illustration, example implementations are described herein in the context of a single sensor device, such as sensor device 120. These implementations and others may apply to any sensor device, such as any one or more sensor devices of FIG. 1.

Referring to both FIGS. 1 and 3, a method is initiated at block 302, where sensor device 120 detects activity in a living space. As indicated herein, activity may include, for example, a person entering a room, a person making a motion from a still position, etc.

At block 304, sensor device 120 determines activity information associated with the activity. In some implementations, the activity information is associated with the activity of the person detected. For example, a person may stand up from a sitting position. The person may walk across a room. The person may enter a room from another room.

As described in more detail herein, in various implementations, activity and activity information generated at block 302 and block 304 may trigger the one or more applications to perform various functionalities.

In various implementations, the sensor devices of residential sensor device platform 100 socialize with each other by sharing information with each other and learning from each other. For example, in various implementations, sensor device 120 exchanges activity information with other sensor devices in the network of sensor devices via a master sensor device and/or wireless router. For example, sensor device 120 may send activity information to one or more other sensor devices. Sensor device 120 may also receive activity information from one or more other sensor devices. As indicated above, the activity information may be exchanged among sensor devices via a master sensor device and/or wireless router. In some implementations, sensor device 120 may function as the master device.

In various implementations, the sensor devices share information and socialize based on one or more attributes. Different sensor devices may share intelligence with other sensor devices in order to optimize protocols of the applications. In some implementations, one attribute may be a particular group to which a given sensor device belongs. For example, one or more sensor devices may belong to a particular ambient sensor group. One or more sensor devices may belong to a particular physical location (e.g., a particular room, a particular portion of a house, etc.). In some implementations, a group of sensor devices need not be in the same house.

In various implementations, one sensor device may be a part of multiple groups, where each group may serve one or more different purposes. For example, a group of sensor devices may be implemented in connection a security application and/or other applications.

At block 306, sensor device 120 determines the time. For example, sensor device 120 may determine that the time is 10:00 am, 2:00 pm, or 7:00 pm, etc. In some implementations, sensor device 120 may also determine a date associated with the time.

At block 308, sensor device 120 follows a procedure based on one or more applications. In various implementations, one or more devices take action not based on the activity information, but based on one or more applications. For example, as described in more detail herein, sensor device 120 may follow a schedule based on the time and based on any one or more applications such as a security application. In some implementations, a particular procedure may end or change based on the time and/or date, or based on other applications, depending on the particular implementation. For example, sensor device 120 may adjust for daylight savings time, end of a school year, guests staying in the house, etc. Furthermore, in some implementations, a particular procedure may make changes to the outdoor surrounding landscape, such as path lights, outdoor security cameras, automatic driveway gate, etc., depending on the particular implementation.

Figure 4:
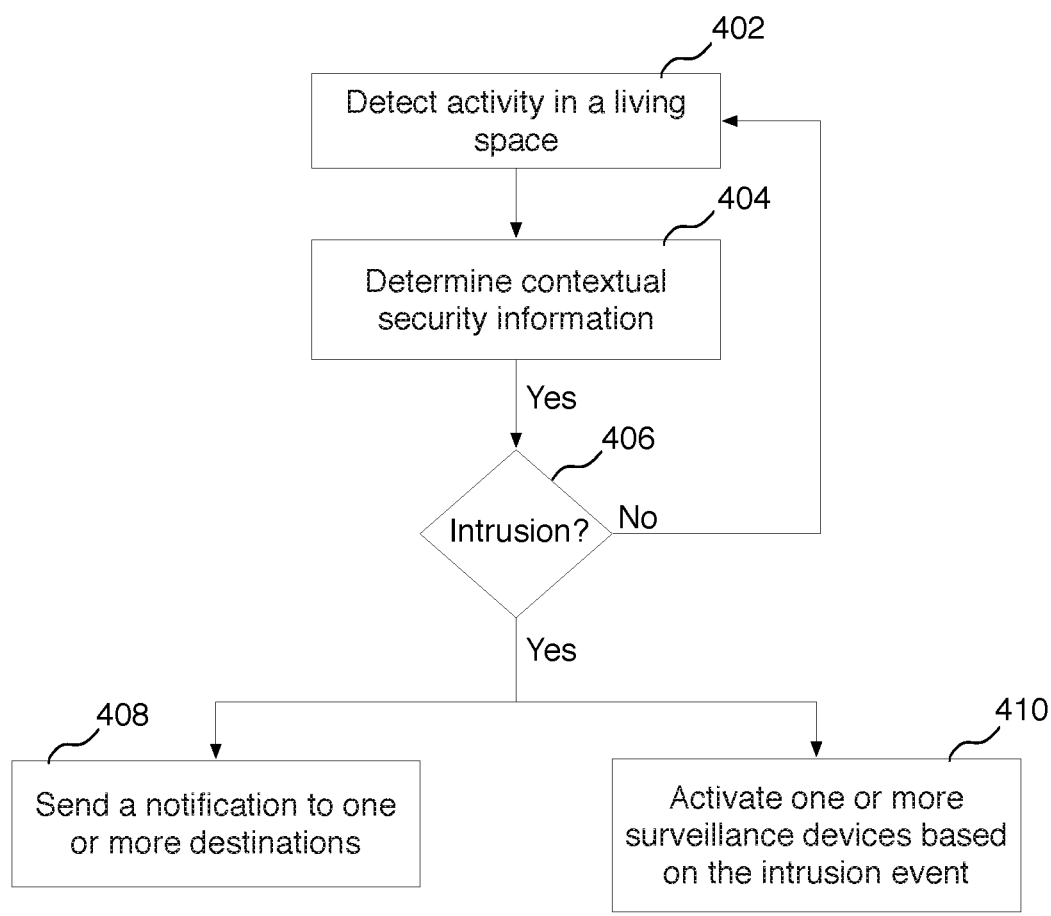
FIG. 4 illustrates an example flow diagram for operation of a security application that detects intrusion events, according to some implementations.

FIG. 4 illustrates an example flow diagram for operation of a security application that detects intrusion events, according to some implementations. In various implementations, the security application functions are based on contextual security information. For example, implementations enable security of not only a living space in general but also security of specific rooms and/or areas within the living space, which may include interior and exterior spaces. In various implementations, the contextual security information may include one or more security signatures, where each security signature characterizes particular user behavior within the living space. In some implementations, the user behavior may include behavior of one or more users in one or more particular locations (e.g., rooms or areas) in the living space. As such, the security application enables security of a living space based on individual rooms or areas of the living space and user behavior in the living space. Contextual security information and security signatures are described in more detail herein.

Referring to both FIGS. 1 and 4, a method is initiated at block 402, where sensor device 120 detects an activity in a living space. In some implementations, the activity includes one or more motions or movements of a person in the living space. As indicated herein, activity may include, for example, a person entering a room, a person making a motion from a still position, etc. As indicated herein, sensor device 120 detects these activities without the use of a camera.

At block 404, sensor device 120 determines contextual security information. In some implementations, the contextual security information includes activity information. In some implementations, the contextual security information includes the detected activity. In some implementations, the contextual security information may include the type of activity such as walking, or standing up from a sitting position. In some implementations, contextual security information may include information about activity with respect to a particular room or area within the living space. For example, contextual security information may include information on whether a person walked within, into, or out of a particular location within the living space (e.g., bedroom, study, kitchen, and other rooms). For example, the contextual security information may include information on whether a person is walking across a room, entering a particular room from another room (e.g., from a hallway into a bedroom). The contextual security information may also include information on general areas in the living space (e.g., particular floors). For example, the contextual security information may include whether a person went from an upper floor to a lower floor.

In some implementations, sensor device 120 may distinguish between a person and a pet based on one or more predetermined criteria such as one or more size, mass, height, and movement or behavior of the person or pet. In some implementations, contextual security information may include whether the detected activity is the activity of a person or a pet.

In some implementations, sensor device 120 may be set to different predetermined modes. For example, sensor device 120 may be in an unoccupied mode or an occupied mode. The unoccupied mode may be based on days and times that the user is not expected to be home. The occupied mode may be based on days and times that the user is expected to be home. In various implementations, the unoccupied mode may have one or more sub-modes such as working-hours mode, sleeping-hours mode, vacation mode, and other modes. The user may set the days and times for each of the working hours mode, vacation mode, etc. For example, the working hours mode may be set to weekdays (e.g., Monday through Friday) during work hours (e.g., from 8 a.m. to 6 p.m.). The vacation mode may be set from a vacation start date and time to a vacation end date. In some implementations, the start date and time of the vacation mode may be when the user sets sensor device to 120 to vacation mode and sets the alarm. In some implementations, the end date and time may be left unprogrammed, where sensor device 120 remains in vacation mode until the user returns from vacation and switches sensor device 120 out of vacation mode.

In some implementations, sensor device 120 may automatically enter one or more unoccupied mode after a predetermined time period of inactivity. For example, if sensor device 120 does not sense the presence of a person for a predetermined amount of time (e.g., 2 hours, 5 hours, etc.), sensor device 120 may enter an unoccupied mode. The particular unoccupied mode may depend on the length of inactivity. In some implementation, the particular unoccupied mode may depend on activity detected by other sensor devices in the residence. For example, a particular sensor device might not go into a vacation mode if another sensor device in the residence detects activity.

In various implementations, the different modes are associated with different alert states. If in vacation mode, sensor device 120 may be in a higher alert state. If not in vacation mode, sensor device 120 may be in a lower alert state. In some implementations, a higher alert state may mean that more events may trigger the determination that an intrusion event has occurred. In some implementations, a lower alert state may mean that fewer events may trigger the determination that an intrusion event has occurred.

As indicated above, in various implementations, activity and activity information generated at block 402 and block 404 may trigger the security application to perform various functions. For example, as described in more detail herein, in various implementations, the security application associated with sensor device 120 performs the steps of block 406 through block 410 based on the activity and activity information generated at block 402 and block 404.

As indicated herein, in various implementations, sensor device 120 exchanges activity information with other sensor devices in the network of sensor devices via a master sensor device and/or wireless router. In some implementations, sensor device 120 may function as the master device.

At block 406, sensor device 120 determines if an intrusion event has occurred based on the activity in the living space. In some implementations, sensor device 120 determines that an intrusion event has occurred when sensor device 120 detects human activity by sensor device 120 when sensor device 120 is in an unoccupied mode. For example, an intrusion event may be determined to have occurred if human activity is detected during normal unoccupied hours and the trigger points do not reflect proper entry points into the house.

In some implementations, sensor device 120 may detect tampering of and/or breakage of entry points such as windows and doors. For example, sensor device 120 may detect an opening of a window or door in a room when there is no other activity in that room. Sensor device 120 may deem this to be an intrusion event during both occupied hours and unoccupied hours.

As indicated herein, in some implementations, sensor device 120 may distinguish between a person and a pet based on one or more predetermined criteria. As such, while in an unoccupied mode, sensor device 120 may detect a pet in the living space but no human activity. As such, sensor device 120 would not render an intrusion event to have occurred. In some implementations, if no intrusion event has occurred, sensor device 120 continues to detect activity in the living space.

In some implementations, sensor device 120 determines if an intrusion event has occurred based on contextual security information. As indicated herein, contextual security information may include one or more of detected activity, a type of detected activity, one or more locations where such activity had occurred in the living space, and one or more security signatures. For example, in the living space, a security signature may be that there is typically activity between 5:00 a.m. and 9:00 a.m. (e.g., family members preparing for work or school), the inactivity between 9:00 a.m. and 4:00 p.m. (e.g., family members away at work or school), activity between 4:00 p.m. and 10:00 p.m. (e.g., family members home from work or school), and the inactivity between 10:00 p.m. and 6:00 a.m. (e.g., family members asleep). Sensor device 120 and other sensor devices may be aware of this contextual security information. In various implementations, sensor device 120 may determine that an intrusion event has occurred if sensor device 120 detects activity that is inconsistent with this security signature. For example, if sensor device 120 detects movement in the living space between 9:00 a.m. and 4:00 p.m., when there should be inactivity.

In various implementations, sensor device 120 and other sensor devices may learn one or more security signatures, where security signatures may include user behavior patterns associated with the contextual security information. In various implementations, sensor device 120 may use pattern matching, pattern learning, and/or machine learning in order to intelligently learn security signatures of the living area. For example, if a given security signature is that there is normally inactivity between 10:00 p.m. and 6:00 a.m. when the family is asleep, sensor device 120 may automatically be set to a predetermined mode such as a sleeping-hours mode, where sensor device 120 is set to a higher alert state. As such, the user need not manually enter information to set the system in the predetermined mode, because the system goes into the predetermined mode automatically.

In some implementations, a given predetermined mode may have predetermined sub-modes. For example, in some implementations, using the sleep-hours mode example, sensor device 120 may have a first sub-mode on an upper floor or particular area(s) (e.g., bedroom(s), bathroom(s)) and have a second sub-mode on the lower floor or particular area(s) (e.g., kitchen). As such, if the system (e.g., sensor device 120 or other sensor device of the system) detects activity based on contextual security information that a person walks from a bedroom to the kitchen, the system may automatically disarm or enter a lower alert state. If the system detects a person entering from the exterior of the living area to the first floor, the system may remain in the second sub-mode with a higher alert state and determine that an intrusion event has occurred.

In some implementations, as indicated herein, if the system detects a pet such as a dog in an area that is associated with a higher alert state, the system may ignore the pet and determine that an intrusion event has not occurred.

In some implementations, the system may assign different alert states to different locations and during particular times during an unoccupied mode. For example, a particular entry to the living space may be used by a service such as a cleaning service, pet sitting service, etc., where a user associated with the service is permitted to enter the living space using a particular entry during particular times. The system may assign a lower alert state to the particular entry during the particular times. As such, if a person is detected entering the living space using the appropriate entry and during appropriate times, the system would determine that an intrusion event has not occurred. If the person remains in the living space for longer than the permitted time period, the system may determine that an intrusion event has occurred.

In some implementations, the contextual security information may include information from a mobile device associated with a user. Such a mobile device may include a smart phone or wearable device.

In some implementations, the system may provide access to one or more areas in the living area based on a person having a mobile device on hand. For example, if the person has a mobile device that is authenticated with the system, the system may disarm or go into a lower alert state for particular rooms or areas if the system detects the person with the mobile device.

At block 408, if sensor device 120 determines that an intrusion event has occurred, sensor device 120 sends a notification to one or more destinations based on the intrusion event. In some implementations, if sensor device 120 determines that an intrusion event has occurred, sensor device 120 alerts other sensor devices of the intrusion event collectively. Sensor device 120 and each of the other sensor devices may make individual decisions such as turning on one or more predetermined lights, turning on an alarm or siren, etc.

At block 410, if sensor device 120 determines that an intrusion event has occurred, sensor device 120 also activates one or more surveillance devices based on the intrusion event. In various implementations, the surveillance device may include video and audio devices. In some implementations, a combination of room sensors and surveillance devices in different rooms may stitch together the entire inside view of the house and what is happening inside the house in case of an intrusion event.

Although the steps, operations, or computations may be presented in a specific order, as shown in the example of FIG. 4, the order may be changed in particular implementations. The ordering of blocks 402 through 410 is merely one example ordering. Other orderings of the blocks/steps are possible, depending on the particular implementation. For example, blocks 408 and block 410 may occur simultaneously, or in any order.

Figure 5:
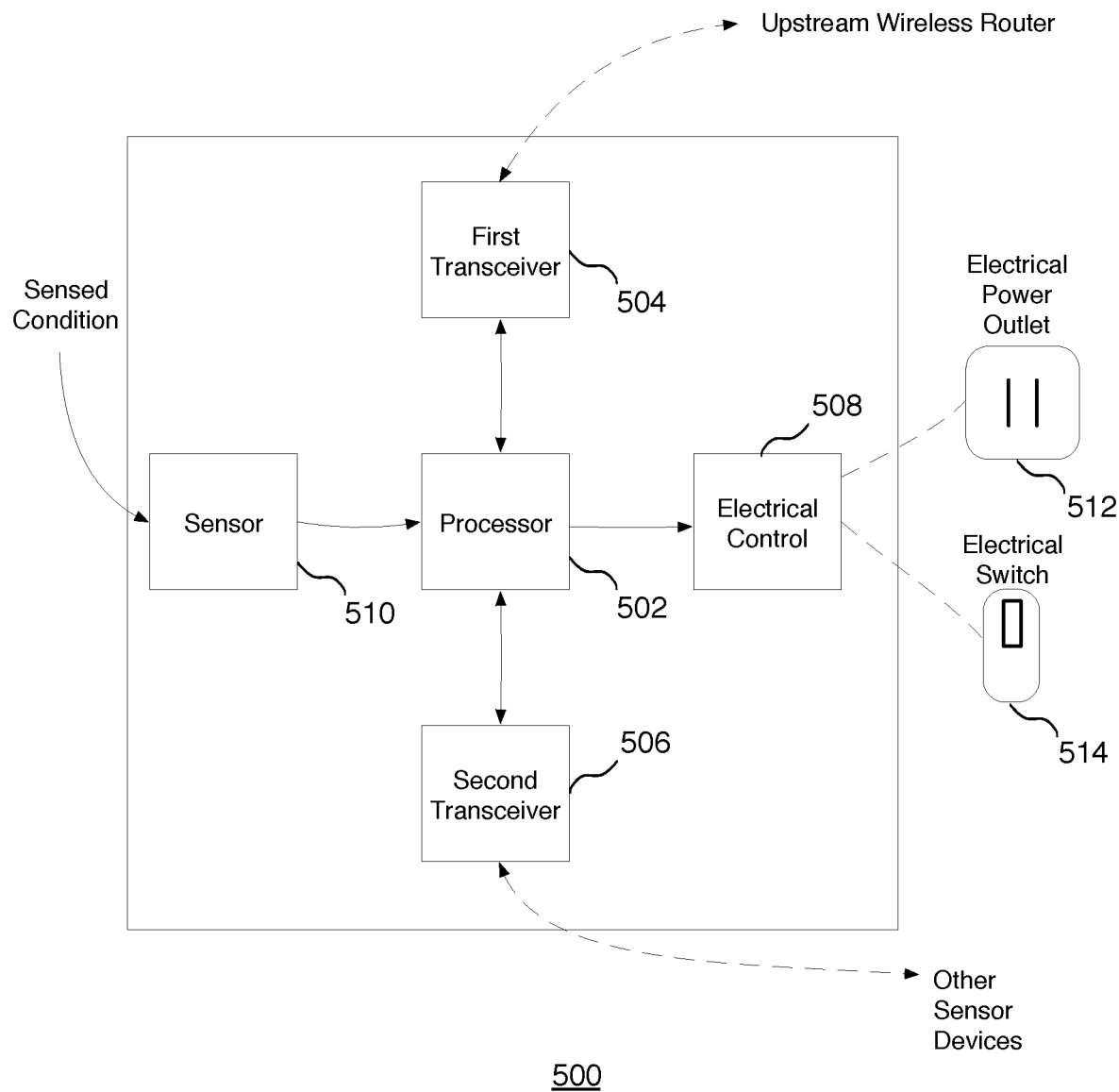
FIG. 5 illustrates a block diagram of an example sensor device, according to some implementations.

FIG. 5 illustrates a block diagram of an example sensor device 500, according to some implementations. In various implementations, sensor device 500 is a residential sensor device that is implemented in residential environments. Sensor device 500 may also be referred to as residential sensor device 500. Sensor device 500 is not limited to residential environments and may be implemented in non-residential environments, including both indoor and outdoor environments. In various implementations, sensor device 500 may be used to implement sensor device 120 of FIG. 1 and/or any of the other sensor devices of FIG. 1.

As shown, for this particular implementation, residential sensor device 500 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, sensor device 500 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, sensor device 500 includes a controller or processor 502. In various implementations, sensor device 500 also includes a first transceiver 504 operative to support uplink communication with a wireless router. In various implementations, the wireless router is an upstream wireless router. Sensor device 500 also includes a second transceiver 506 operative to support mesh link communication with other sensor devices. Sensor device 500 also includes an electrical control 508 that controls one or more electrical power outlets 512 and/or one or more electrical switches 514. In various implementations, sensor device 500 includes a sensor 510 operative to sense a condition of a living space. For ease in illustration, one sensor 510 is shown. However, in various implementations, sensor 510 may represent multiple sensors. For example, sensor device 500 may include a light sensor, a motion sensor, a thermometer, a barometer, a moisture sensor, etc. In some implementations, processor 502 is operative to communicate with the wireless router through the first transceiver, communicate with other sensor devices through the second transceiver, and receive the sensed condition of the living space. As indicated herein, a living space may include indoor and outdoor spaces.

In various implementations, if sensor device 500 functions as a master sensor device, sensor device 500 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

In various implementations, one or more processors of the sensor devices are operative to select a master sensor device from the sensor devices, where the master sensor device maintains communication with the wireless router, and where other sensor devices of the sensor devices are designated as slave sensor devices and form a wireless mesh network with the other sensor devices through wireless communication with the other sensor devices through the second transceivers of the slave sensor devices.

For ease of illustration, FIG. 5 shows one block for each of processor 502, first transceiver 504, second transceiver 506, electrical control 508, sensor 510, electrical power outlet 512, and electrical switch 514. Each of blocks 502, 504, 506, 508, 510, 512, and 514 may represent multiple first transceivers, second transceivers, electrical controls, sensor devices, processors, electrical power outlets, and electrical switches.

In other implementations, sensor device 500 may not have all of the components shown and/or may have other elements including other types of elements instead of, or in addition to, those shown herein. For example, sensor device 500 may be implemented by computing device 600 of FIG. 6, which is described in more detail below. In various implementations, sensor device 500 may include a combination of some or all of the elements shown in FIGS. 5 and 6, and may include other types of elements instead of, or in addition to, those shown in FIGS. 5 and 6.

In some example implementations, sensor device 500 function as a master sensor device. However, other sensor devices may also function as master sensor devices. Also, in some scenarios, sensor device 500 may function as a slave sensor device relative to another master sensor device. In some implementations, the residential sensor device platform may include multiple different master sensor devices at a given time. For example, there may be multiple master sensor devices for different applications.

In various implementations, sensor device 500 and the sensor devices of the residential sensor device platform may be referred to as a hybrid mesh, because the sensor devices may have functions and capabilities of a mesh network, and the sensor devices may also have one or more master sensor devices simultaneously or serially. In various implementations, the sensor devices of the residential sensor device platform may include point-to-point plus repeater functionality.

Link or interface differentiation between the master sensor device and the mesh versus the master device and the wireless router may be achieved according to the following implementations. For example, in various implementations, the different links are dual interfaces in that one interface is among sensor devices of a mesh network, and a different, separate interface is between the master sensor device and a wireless router. In various implementations, the different links may be implemented as a dual interface or dual channel using a common radio, or multiple links or channels of a common radio.

In some implementations, one or more processors of respective sensor devices are operative to select the master sensor device from the sensor devices, where the master sensor device maintains communication with the upstream wireless router. In various implementations, as indicated above, the non-master sensor devices of the wireless sensor devices are designated as slave sensor devices. In various implementations, the wireless devices form a wireless mesh network through wireless communication through their respective second transceivers.

In some implementations, each sensor device checks or determines its proximity to the access point or upstream wireless router. In some implementations, the proximity is estimated based on the signal strength or signal quality of signals received by the device from the upstream wireless router. The sensor device having the highest received signal strength of the highest signal quality wins. That sensor device with the highest signal quality is selected as the master sensor device, and the other sensor devices are designated as the slave sensor devices. In some implementations, the sensor device closest to a home access point becomes the master sensor device with dual interface (e.g., active, active). The other sensors devices become slaves and participate in client mode (e.g., active, passive).

In some implementations, mobile applications may directly connect to any sensor device. In some implementations, each sensor device may configure itself through network sharing (e.g., physical unclonable function (PUF) and/or advanced encryption standard (AES) 128-bit encryption, etc.). In various implementations, third-party devices may participate in the quasi-mesh network if authenticated. In some implementations, slave devices send data to a master device every predetermined time period (e.g., every 10 minutes, 15 minutes, etc.), which is configurable. In some implementations, a master sensor device packages data from all devices in a predetermined time period (e.g., 10-minute window, 15-minute window, etc.), and pushes the data to the cloud server, which in turn may push the data to one or more applications at predetermined time periods (e.g., every 10 minutes, 15 minutes, etc.). In some implementations, one or more applications may automatically synchronize data with the cloud servers at predetermined time interviews (e.g., hourly basis, etc.) if data is not pushed from the cloud server. Real-time info may be available on refresh or based on event policies. Applications directly interact with local devices.

In some implementations, if the selected master sensor device fails, the one or more processors of the sensor devices reselect the master sensor device from the other sensor devices. That is, the wireless mesh network formed by the sensor devices is operative to configure themselves to self-configure or self-heal if one or more of the sensor devices fail. For example, in some implementations, the self-healing may include sensor devices of the wireless mesh network selecting a new master sensor device if the present master sensor device fails. In various implementations, all sensor devices have dual link, uplink, and mesh link functionality, and any of the currently non-master sensor devices may be eligible to become a new master device. In some implementations, a sensor device that was previously a master sensor device and that was later replaced (e.g., due to failure or other reason, etc.) may again be selected as the new master sensor device based on one or more predetermined criteria (e.g., getting fixed, etc.).

In some implementations, the self-healing includes selecting new routing paths from the master device to downstream sensor devices if one or more of the sensor devices of the residential sensor device platform fail. In various implementations, the meshing functionality of the sensor devices provides auto-range extender functionality for other devices to participate as a network service provider.

In some implementations, the signal strength or quality determination and rankings are further used to identify the second best and/or third best signal strengths, and the sensor devices are ranked accordingly. These sensor devices can be used as backup master sensor devices if the current master sensor device fails for some reason. In various implementations, the ranking is based on signal strengths and may be used to determine a priority for backup. For example, in some implementations, the highest-ranking sensor device may be selected as the master sensor device. If the highest-ranking sensor device is not available, the next highest ranking sensor device may be selected as the master sensor device. If there is a tie, the master sensor device may be selected randomly or based on another aspect (e.g., proximity, etc.).

In some implementations, one or more of the sensor devices are associated with one or more electrical power outlets and/or and one or more electrical light switches.

In various implementations, each of the one or more processors of the one or more of respective sensor devices is operative to control operation of the electrical control (which may in turn control one or more electrical power outlets and/or one or more electrical light switches) based on at least the sensed condition of the living space. In some implementations, the sensed condition may be based on various types of sensors (e.g., a light sensor, a motion sensor, a thermometer, a barometer, etc.) indicating various aspects of the living space.

In various implementations, each of the one or more processors of the one or more respective sensor devices is operative to control operation an electrical control (which may in turn control one or more electrical power outlets and/or one or more electrical light switches) based on at least the sensed occupancy of the living space. In some implementations, the sensed occupancy may be based on a motion sensor indicating that the living space is being occupied by a person. In some implementations, the sensed occupancy may include a sensed occupancy of a space proximate to the one or more sense devices. In some implementations, the sensed condition includes a sensed occupancy.

In various implementations, the sensed conditions and/or the sensed occupancy may be shared over the mesh network to control one or more of the power outlets or one or more of the electrical switches. The control may include turning the power of the one or more power outlets on or off, or switching the one or more electrical switches on or off.

In some implementations, one or more processors of sensor device 500, as well as those of other sensor devices, are operative to at least partially control operation of another device. In some implementations, the other devices may include one or more of a water heater, watering systems, garage door, etc. The sense information of sensor device 500 may be used to determine a condition of another device, and advantageously control the other device. For example, sensed occupancy (or the lack of) can be used to determine whether a water heater should be active or not. Generally, the other devices need not necessarily have a sensor. Such devices may rely on the sensing information of one of the sensor devices.

In some implementations, one or more processors of sensor device 500, as well as those of other sensor devices, are operative to at least partially control operation of the sensor devices themselves or another device based on timing. For example, situations can include control of certain lights of a residence that need to be turned on, for example, at 8:00 PM, but ideally also take in account occupancy within the residence. For example, front lights of a residence and back lights of the residence may be controlled differently depending upon occupancy within the residence.

In some implementations, one or more processors of sensor device 500, as well as those of other sensor devices, are operative to at least partially control operation of themselves or another device based on environmental parameters.

Figure 6:
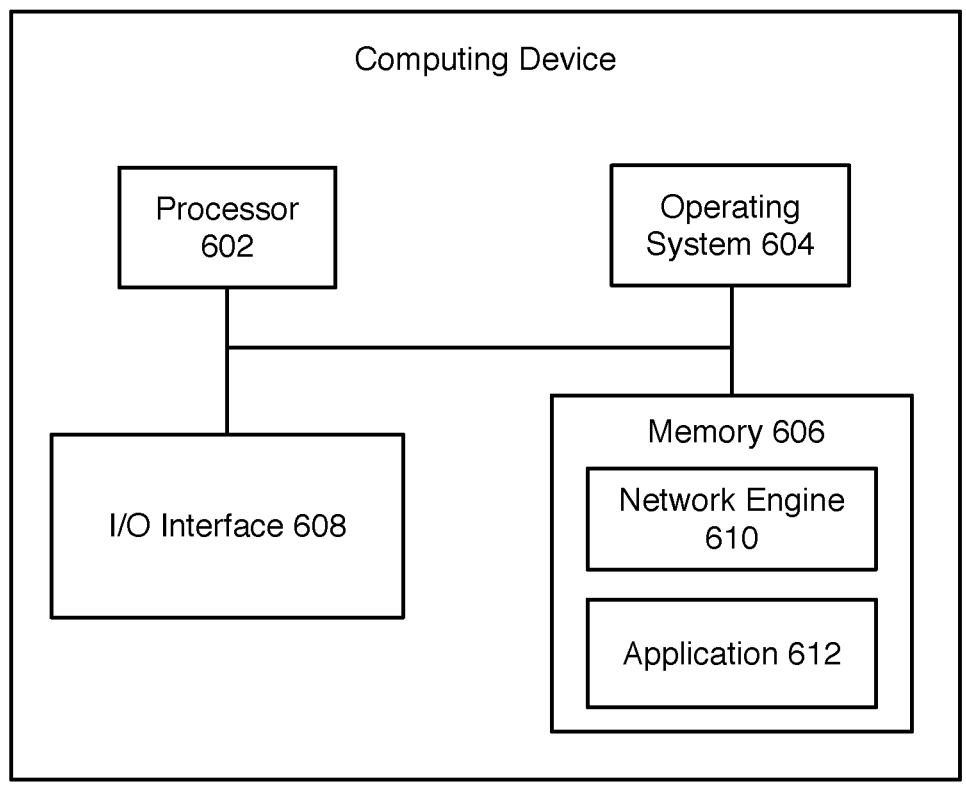
FIG. 6 illustrates a block diagram of an example computing device, according to some implementations.

FIG. 6 illustrates a block diagram of an example computing device 600, according to some implementations. For example, computing device 600 may be used to implement a sensor device such as sensor device 500 of FIG. 5, sensor device 120 and/or other sensor devices of FIG. 1, as well as to perform the implementations described herein. In some implementations, computing device 600 includes a processor 602, an operating system 604, a memory 606, and an input/output (I/O) interface 608. Computing device 600 also includes a network engine 610 and an application 612, which may be stored in memory 606 or on any other suitable storage location or computer-readable medium. Application 612 provides instructions that enable processor 602 to perform the functions described herein and other functions. For ease of illustration, one application 612 is shown. Application 612 may represent multiple applications. For example, multiple applications such as a security application may be stored in memory 606 and executed by processor 602.

For ease of illustration, FIG. 6 shows one block for each of processor 602, operating system 604, memory 606, I/O interface 608, network engine 610, and application 612. These blocks 602, 604, 606, 608, 610, and 612 may represent multiple processors, operating systems, memories, I/O interfaces, network engines, and applications. In other implementations, computing device 600 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these embodiments are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential electrical switch sensor device platform comprising:
   a plurality of sensor devices, wherein each sensor device of the plurality of sensor devices communicates with a wireless router and with other sensor devices of the plurality of sensor devices, and wherein each sensor device includes one or more sensors operative to sense activity in a living space and includes a processor operative to perform operations comprising:
   detecting an activity in the living space;
   determining contextual security information associated with the activity, wherein the contextual security information comprises information about a type of the activity, a time of the activity, and one or more areas in the living space in which the activity occurred, and wherein the one or more areas in the living space comprise at least one first area associated with a first sub-mode of operation and comprise at least one second area associated with a second sub-mode of operation;

determining one or more security signatures, wherein each security signature of the one or more signatures includes contextual security information associated with routine activity, and wherein the routine activity comprises movement of a person in the living space;

operating in a low alert state of the first sub-mode of operation if the activity comprises the person moving between the at least one first area and the least one second area in the living space;

operating in a high alert state of the second sub-mode of operation if the activity comprises the person moving to the at least one second area from outside the living space;

determining an occurrence of an intrusion event based on the activity and based on one of the first sub-mode of operation and the second sub-mode of operation, wherein the intrusion event has occurred if the activity is inconsistent with the one or more security signatures; and in response to the occurrence of the intrusion event, the processor of each sensor device is operative to perform further operations comprising one or more of:
sending a notification to one or more destinations based on the intrusion event; and
activating one or more surveillance devices based on the intrusion event.

2. The residential sensor device platform of claim 1, wherein the high alert state increases a number of events that trigger the determination that an intrusion event has occurred, and wherein the low alert state decreases a number of events that trigger the determination that an intrusion event has occurred.

3. The residential sensor device platform of claim 1, wherein the contextual security information comprises activity information.

4. The residential sensor device platform of claim 1, wherein the processor is further operative to perform operations comprising enabling each of the sensor devices to be set to a predetermined mode.

5. The residential sensor device platform of claim 1, wherein the processor is further operative to perform operations comprising exchanging activity information with other sensor devices of the plurality of sensor devices.

6. The residential sensor device platform of claim 1, wherein an intrusion event has occurred if human activity is detected by at least one sensor device when the at least one sensor device is in an unoccupied mode.

7. The residential sensor device platform of claim 1, wherein if at least one sensor device determines that an intrusion event has occurred, the at least one sensor device alerts other sensor devices of the intrusion event.

8. An electrical switch sensor device comprising:
one or more sensors operative to sense an activity in a living space;
a processor operative to perform operations comprising:
detecting an activity in the living space;
determining contextual security information associated with the activity, wherein the contextual security information comprises information about a type of the activity, a time of the activity, and one or more areas in the living space in which the activity occurred, and wherein the one or more areas in the living space comprise at least one first area associated with a first sub-mode of operation and comprise at least one second area associated with a second sub-mode of operation;

determining one or more security signatures, wherein each security signature of the one or more signatures includes contextual security information associated with routine activity, and wherein the routine activity comprises movement of a person in the living space;

operating in a low alert state of the first sub-mode of operation if the activity comprises the person moving between the at least one first area and the least one second area in the living space;

operating in a high alert state of the second sub-mode of operation if the activity comprises the person moving to the at least one second area from outside the living space;

determining an occurrence of an intrusion event based on the activity and based on one of the first sub-mode of operation and the second sub-mode of operation, wherein the intrusion event has occurred if the activity is inconsistent with the one or more security signatures; and in response to the occurrence of the intrusion event, the processor is operative to perform further operations comprising one or more of:
sending a notification to one or more destinations based on the intrusion event; and
activating one or more surveillance devices based on the intrusion event.

9. The sensor device of claim 8, wherein the activity comprises one or more motions of a person in the living space.

10. The sensor device of claim 8, wherein the contextual security information comprises activity information.

11. The sensor device of claim 8, wherein the processor is further operative to perform operations comprising enabling the sensor device to be set to a predetermined mode.

12. The sensor device of claim 8, wherein the processor is further operative to perform operations comprising exchanging activity information with other sensor devices of a plurality of sensor devices.

13. The sensor device of claim 8, wherein an intrusion event has occurred if human activity is detected by the sensor device when the sensor device is in an unoccupied mode.

14. The sensor device of claim 8, wherein if at least one sensor device determines that an intrusion event has occurred, the sensor device alerts other sensor devices of the intrusion event.

15. A computer-implemented method for operation of a residential electrical switch sensor device platform, the method comprising:
detecting, by a sensor device, an activity in a living space;
determining, by the sensor device, contextual security information associated with the activity, wherein the contextual security information comprises information about a type of the activity, a time of the activity, and one or more areas in the living space in which the activity occurred, and wherein the one or more areas in the living space comprise at least one first area associated with a first sub-mode of operation and comprise at least one second area associated with a second sub-mode of operation;
determining, by the sensor device, one or more security signatures, wherein each security signature of the one or more signatures includes contextual security information associated with routine activity, and wherein the routine activity comprises movement of a person in the living space;

operating in a low alert state of the first sub-mode of operation if the activity comprises the person moving between the at least one first area and the least one second area in the living space;

operating in a high alert state of the second sub-mode of operation if the activity comprises the person moving to the at least one second area from outside the living space;

determining, by the sensor device, an occurrence of an intrusion event based on the activity and based on one of the first sub-mode of operation and the second sub-mode of operation, wherein the intrusion event has occurred if the activity is inconsistent with the one or more security signatures; and in response to the occurrence of the intrusion event, the method further comprises one or more of:

sending, by the sensor device, a notification to one or more destinations based on the intrusion event; and activating, by the sensor device, one or more surveillance devices based on the intrusion event.

16. The method of claim 15, wherein the activity comprises one or more motions of a person in the living space.

17. The method of claim 15, wherein the contextual security information comprises activity information.

18. The method of claim 15, wherein the method further comprises enabling, by the sensor device, other sensor devices to be set to a predetermined mode.

19. The method of claim 15, wherein the method further comprises exchanging, by the sensor device, activity information with other sensor devices of a plurality of sensor devices.

20. The method of claim 15, wherein an intrusion event has occurred if human activity is detected by the sensor device when the sensor device is in an unoccupied mode.

* * * * *